United States Patent
Takami et al.

(10) Patent No.: US 10,634,528 B2
(45) Date of Patent: Apr. 28, 2020

(54) INFORMATION PROCESSING DEVICE, MAINTENANCE APPARATUS, INFORMATION PROCESSING METHOD, AND STORAGE MEDIUM

(71) Applicant: Yokogawa Electric Corporation, Tokyo (JP)

(72) Inventors: Go Takami, Tokyo (JP); Yuichi Nozaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 249 days.

(21) Appl. No.: 15/811,827

(22) Filed: Nov. 14, 2017

(65) Prior Publication Data
US 2018/0143046 A1    May 24, 2018

(30) Foreign Application Priority Data

Nov. 18, 2016   (JP) ................... 2016-225030

(51) Int. Cl.
*G01D 18/00*     (2006.01)
*G06N 99/00*     (2019.01)
*G05B 9/02*      (2006.01)
*G06N 20/00*     (2019.01)

(52) U.S. Cl.
CPC ............. *G01D 18/00* (2013.01); *G05B 9/02* (2013.01); *G05B 2219/24019* (2013.01); *G05B 2219/32234* (2013.01); *G05B 2219/42329* (2013.01); *G06N 20/00* (2019.01)

(58) Field of Classification Search
CPC .......... G01D 18/00; G05B 2219/24019; G05B 2219/32234; G05B 2219/42329; G05B 9/02; G06N 20/00
USPC .................................... 702/183, 184; 706/12
See application file for complete search history.

(56) References Cited

U.S. PATENT DOCUMENTS

| 10,165,412 | B2* | 12/2018 | Ono .......................... G06F 3/14 |
| 2004/0267395 | A1 | 12/2004 | Discenzo et al. |
| 2014/0257526 | A1 | 9/2014 | Tiwari et al. |
| 2018/0136616 | A1* | 5/2018 | Takami ................ G01D 18/008 |

FOREIGN PATENT DOCUMENTS

| EP | 2905665 A2 | 8/2015 |
| EP | 3252722 A1 | 12/2017 |
| JP | 2014-174993 A | 9/2014 |
| JP | 2015-530652 A | 10/2015 |

(Continued)

OTHER PUBLICATIONS

WO 2017/047296 A1 Published on Mar. 23, 2017 (English translation) (Year: 2017).*

(Continued)

*Primary Examiner* — John H Le
(74) *Attorney, Agent, or Firm* — Sughrue Mion, PLLC

(57) ABSTRACT

An information processing device according to one aspect of the present invention includes a first acquirer configured to acquire measured data of a sensor, a second acquirer configured to acquire characteristic data of the sensor, the characteristic data having been acquired by maintaining the sensor, and a generator configured to generate teacher data in which the acquired characteristic data is associated as label information with the acquired measured data.

16 Claims, 8 Drawing Sheets

(56) References Cited

FOREIGN PATENT DOCUMENTS

| WO | 2014/031264 A2 | 2/2014 | |
| WO | 2017/047296 | * 3/2017 | ............. G06F 16/00 |

OTHER PUBLICATIONS

Go Takami et al., "Machine Learning Applied to Sensor Data Analysis", Yokogawa Technical Report, 2016, pp. 27-30, vol. 59, No. 1.

* cited by examiner (A)

| MEASUREMENT DATE AND TIME | MEASURED DATA | SETTLING TIME | LABEL |
|---|---|---|---|
| 2016/10/01 10:00:00 | 10.123 | — | A |
| 2016/10/01 10:01:00 | 10.122 | — | A |
| ... | ... | — | ... |
| 2016/10/25 15:35:00 | 10.246 | A | A |
| 2016/10/25 15:36:00 | 10.247 | — | B |
| 2016/10/25 15:37:00 | 10.246 | — | B |
| ... | ... | — | ... |
| 2016/12/10 12:21:00 | 11.345 | B | B |
| 2016/12/10 12:22:00 | 11.344 | — | C |
| 2016/12/10 12:23:00 | 11.347 | — | C |
| ... | ... | — | ... |
| 2017/01/20 14:45:00 | 12.456 | C | C |

(B)

| MEASURED DATA | LABEL |
|---|---|
| 10.123 | A |
| 10.122 | A |
| ... | ... |
| 10.246 | A |
| 10.247 | B |
| 10.246 | B |
| ... | ... |
| 11.345 | B |
| 11.344 | C |
| 11.347 | C |
| ... | ... |
| 12.456 | C |

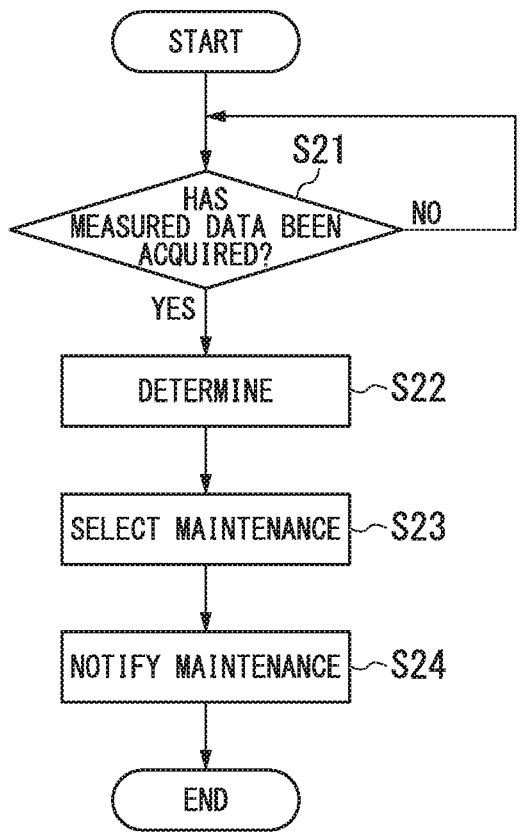

INFORMATION PROCESSING DEVICE, MAINTENANCE APPARATUS, INFORMATION PROCESSING METHOD, AND STORAGE MEDIUM

BACKGROUND OF THE INVENTION

Field of the Invention

The present invention relates to an information processing device, a maintenance apparatus, an information processing method, and a storage medium.

The present application claims priority based on Japanese patent application 2016-225030, filed on Nov. 18, 2016 and includes herein by reference the content thereof.

Description of Related Art

In factories and plants such as industrial plants such as chemical plants and the like, plants for managing and controlling well sites such as gas fields, oil fields, and their surroundings, plants for managing and controlling hydroelectric power generation, thermal power generation, and nuclear power generation, plants for managing and controlling environmental power generation such as solar power generation and wind power generation, and plants for managing and controlling drinking water and sewage, dams, and the like (hereinafter collectively referred to as plants), a distributed control system (DCS) in which an on-site device such as a measuring instrument or an operating instrument referred to as a field device and a control device for controlling the on-site device are connected via a communication means has been constructed to implement advanced automatic operations.

In a plant system or the like constructed to implement the above-described advanced automatic operations, states of the plant such as a plant yield, an operation state, or a state of occurrence of an alarm are measured by sensors (including measuring devices or the like) disposed in the plant. Measured data (a process variable (PV)) measured by the sensor is acquired by a control device such as a DCS and output as an amount of manipulation (manipulative variable (MV)) to an actuator or the like, so that the measured data is used for controlling the plant.

In a sensor configured to measure the measured data, a measured value may shift due to deterioration of the sensor, dirt may adhere to a measuring unit of the sensor, or a failure (deterioration or the like) may occur depending on the lifetime of the sensor. For example, it is possible to check a state of progress of deterioration or the like of a sensor through maintenance in which a maintenance worker who performs maintenance of the sensor measures characteristic data such as a settling time of the sensor. The maintenance worker puts the sensor in an offline state in which the sensor is separated from the DCS and measures characteristic data. The maintenance worker ascertains a state of progress of deterioration of a sensor according to the measured characteristic data and performs maintenance of adjusting, cleaning or replacing the sensor.

Regardless of the state of progress of deterioration of a sensor or the like, there are some cases in which the maintenance of adjusting the sensor or the like is periodically performed in a predetermined cycle.

Also, there is a machine learning system for creating a determination model through machine learning by designating measured data as teacher data for each of sensors in which a usage time or a usage environment is different and diagnosing deterioration or the like of the sensors according to a determination model in order to determine the deterioration or the like of the sensors from the measured data. For example, see Japanese Unexamined Patent Application, First Publication No. 2014-174993, Published Japanese Translation No. 2015-530652 of the PCT International Publication, and Go Takami et al., "Machine Learning Applied to Sensor Data Analysis", Yokogawa Technical Report, Yokogawa Electric Corporation, Vol. 59, No. 1 (2016), p. 27-30.

SUMMARY OF THE INVENTION

In order to measure the characteristic data of a sensor, there are some cases in which it is necessary to stop the operation of the plant since measurement in an offline state is required. Since high-level expertise is required for measuring characteristic data of a sensor, it is necessary to secure highly specialized maintenance workers. Accordingly, there are some cases in which the cost of maintenance accompanying the measurement of the characteristic data is increased.

The state of progress of deterioration or the like of a sensor greatly differs according to a usage state or an installation environment of the sensor. If periodic maintenance is uniformly performed on all sensors in which the states of progress of deterioration or the like are different, maintenance is performed on sensors for which adjustment is not yet required. There are some cases in which the cost of maintenance accompanying periodic maintenance is increased in a plant in which a large number of sensors are used.

In order to determine deterioration or the like of a sensor according to machine learning, it is necessary to manually prepare teacher data in which measured data and characteristic data obtained by maintenance are associated in advance. Accordingly, there are some cases in which the cost of maintenance accompanying an operation of machine learning is increased.

One aspect of the present invention provides an information processing device, a maintenance apparatus, an information processing method, and a storage medium capable of reducing an increase in cost resulting from maintenance.

An information processing device according to a first aspect of the present invention may include a first acquirer configured to acquire measured data of a sensor, a second acquirer configured to acquire characteristic data of the sensor, the characteristic data having been acquired by maintaining the sensor, and a generator configured to generate teacher data in which the acquired characteristic data is associated as label information with the acquired measured data.

The above-described information processing device may further include a learner configured to learn the generated teacher data to generate a determination model for determining the label information to be associated with the acquired measured data.

The above-described information processing device may further include a determiner configured to determine the label information to be associated with the acquired measured data using the generated determination model.

The above-described information processing device may further include a storage storing the label information of and maintenance to be performed on the sensor which associated with each other, a selector configured to select maintenance associated with the determined label information from the stored maintenance, and a notifier configured to perform notification of the selected maintenance.

In the above-described information processing device, the generator may be configured to generate the teacher data in which the label information of the acquired characteristic data is associated with a plurality of pieces of previous measured data in which the label information has not been associated.

In the above-described information processing device, the second acquirer may be configured to acquire a settling time of the sensor as the characteristic data.

In the above-described information processing device, the second acquirer may be configured to acquire a shift amount of a zero point in zero point adjustment of the sensor as the characteristic data.

In the above-described information processing device, the second acquirer may be configured to acquire a shift amount of a span in span adjustment of the sensor as the characteristic data.

A maintenance apparatus according to a second aspect of the present invention may include a first acquirer configured to acquire measured data of a sensor, a first generator configured to generate characteristic data on the basis of the measured data, and a second generator configured to generate teacher data in which the generated characteristic data is associated as label information with the acquired measured data.

In the above-described maintenance apparatus, the first generator may be configured to generate a settling time of the sensor as the characteristic data.

An information processing method according to a third aspect of the present invention may include acquiring measured data of a sensor, acquiring characteristic data of the sensor, the characteristic data having been acquired by maintaining the sensor, and generating teacher data in which the acquired characteristic data is associated as label information with the acquired measured data.

The above-described information processing method may further include learning the generated teacher data to generate a determination model for determining the label information to be associated with the acquired measured data.

The above-described information processing method may further include determining the label information to be associated with the acquired measured data using the generated determination model.

The above-described information processing method may further include storing the label information and maintenance to be performed on the sensor which are associated with each other, selecting maintenance associated with the determined label information from the stored maintenance, and performing notification of the selected maintenance.

In the above-described information processing method, generating the teacher data may include generating the teacher data in which the label information of the acquired characteristic data is associated with a plurality of pieces of previous measured data in which the label information has not been associated.

In the above-described information processing method, acquiring the characteristic data may include acquiring a settling time of the sensor as the characteristic data.

In the above-described information processing method, acquiring the characteristic data may include acquiring a shift amount of a zero point in zero point adjustment of the sensor as the characteristic data.

In the above-described information processing method, acquiring the characteristic data may include acquiring a shift amount of a span in span adjustment of the sensor as the characteristic data.

The above-described information processing method may further include generating characteristic data on the basis of the acquired measured data. Generating the teacher data may include generating teacher data in which the generated characteristic data is associated as label information with the acquired measured data.

A non-transitory computer-readable storage medium storing a program according to a fourth aspect of the present invention, which when executed by a computer, may cause the computer to acquire measured data of a sensor, acquire characteristic data of the sensor, the characteristic data having been acquired by maintaining the sensor, and generate teacher data in which the acquired characteristic data is associated as label information with the acquired measured data.

According to one aspect of the present invention, it is possible to provide an information processing device, a maintenance apparatus, an information processing method, and a storage medium capable of reducing an increase in cost resulting from maintenance work.

BRIEF DESCRIPTION OF THE DRAWINGS

FIG. 6 is a flowchart showing an example of an operation of an execution phase in the information processing device of the embodiment.

FIG. 7 is a diagram showing an example of an association between characteristic data and maintenance stored by the information processing device of the embodiment.

DETAILED DESCRIPTION OF THE INVENTION

Hereinafter, an information processing device, a maintenance apparatus, an information processing method, and a storage medium in an embodiment of the present invention will be described in detail with reference to the drawings.

Figure 1:
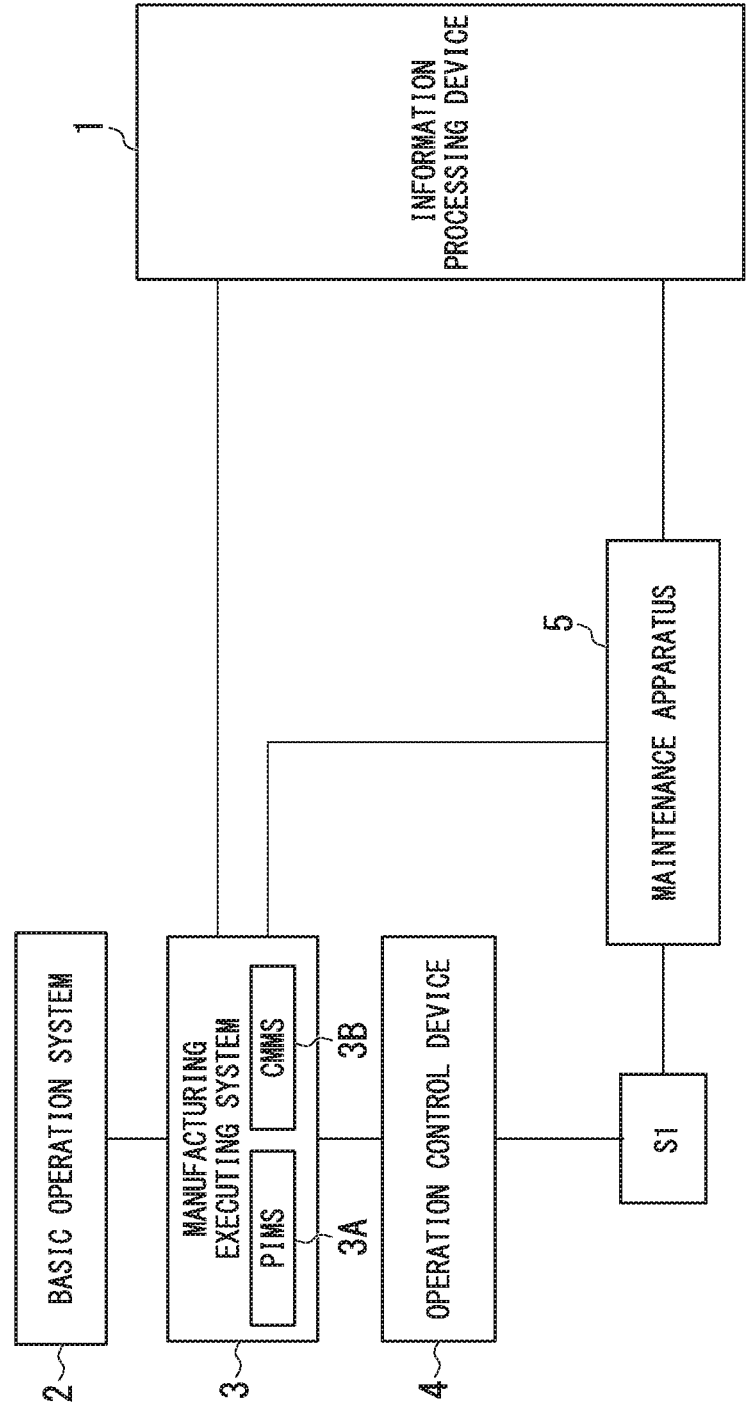
FIG. 1 is a diagram showing a configuration example of a plant using an information processing device of an embodiment.

The summary of a plant using an information processing device will be described with reference to FIG. 1. FIG. 1 is a diagram showing a configuration example of a plant using the information processing device of the embodiment. In FIG. 1, a plant 100 includes an information processing device 1, a basic operation system 2, a manufacturing executing system 3, an operation control device 4, and a maintenance apparatus 5. A sensor S1 provided in the plant 100 or a valve or a pump (not shown) or the like is hereinafter referred to as a "field device." The plant 100 generates a predetermined product (manufactured product) according to the configuration of the above-described plant.

The sensor S1 measures measured data indicating an operation state of the plant 100. The measured data indicating an operation state of the plant 100 is, for example, physical quantity data such as a pressure, a temperature, a pH, and a flow rate of a product in a process of the plant. The sensor S1 outputs the measured data to the operation control device 4.

The information processing device 1 acquires the measured data measured by the sensor S1. The measured data measured by the sensor S1 is input to the manufacturing executing system 3 via the operation control device 4 or directly from the sensor S1. In FIG. 1, the information processing device 1 acquires measured data from the manufacturing executing system 3. The information processing device 1 acquires characteristic data of the sensor S1 measured by the maintenance apparatus 5 from the maintenance apparatus 5. Details of the information processing device 1 will be described below with reference to FIG. 2 and the like.

The basic operation system 2 is, for example, an enterprise resource planning (ERP) system for the process manufacturing industry for managing management resources such as accounting processing, production management, and sales management. The basic operation system 2 may use the information of the operation state of the plant as the management information for the management resources. The basic operation system 2 may include a maintenance management system or the like for managing business information for maintenance and repair of the plant. The basic operation system 2 is, for example, a general-purpose computer such as a server device, a desktop type PC, or the like.

The manufacturing executing system 3 is, for example, a manufacturing executing system (MES) located between the basic operation system 2 and the operation control device 4, and monitors or manages an operation state of the field device acquired by the operation control device 4, a work state of a worker, or the like. The manufacturing executing system 3 is, for example, a general-purpose computer such as a server device, a desktop type PC or the like. The manufacturing executing system may include a function of a plant information management system (PIMS) 3A, a computerized maintenance management system (CMMS: plant maintenance management system) 3B, or the like.

The PIMS 3A in the manufacturing executing system 3 functions as a plant information management system that collects and records plant state information. In FIG. 1, the PIMS 3A collects and records the measured data of the sensor S1 via the operation control device 4 (or directly without involving the operation control device 4). The PIMS 3A collects the measured data of the sensor S1 in time series and records the collected measured data as history data (historical data, historian). The history data includes the measured data of the sensor S1 and a date and time when the measured data was measured. The PIMS 3A provides history data of the measured data to the information processing device 1 and also provides current (latest) measured data. For example, when the measured data of the sensor S1 is acquired, the PIMS 3A provides the acquired measured data to the information processing device 1 and records the acquired measured data as the history data. The PIMS 3A provides the information processing device 1 with the recorded history data, for example, periodically or in response to an acquisition request from the information processing device 1. The history data is a history of a plurality of pieces of measured data recorded during a predetermined period such as 1 hour, 1 day, 1 week, or the like. In the present embodiment, the history data of the measured data is used as the teacher data to be used in a learning phase of machine learning executed in the information processing device 1.

The CMMS 3B in the manufacturing executing system 3 records a maintenance history of the plant 100 and functions as a plant maintenance management system that manages the maintenance plan. For example, the CMMS 3B acquires, from the plurality of maintenance apparatuses 5, an operation history of maintenance operations for field devices that is performed and recorded by the maintenance apparatus 5 and records the operation history as maintenance information. The CMMS 3B may record the maintenance performed by the field operator as maintenance information capable of being manually input. The CMMS 3B may provide the information processing device 1 with the maintenance information to be provided to the information processing device 1 by the maintenance apparatus 5.

The operation control device 4 controls processes in the plant 100 by controlling pumps, valves, heaters, and the like (not shown) on the basis of the measured data acquired from the sensor S1. The operation control device 4 provides measured data acquired from the sensor S1 to the manufacturing executing system 3. The operation control device 4 is, for example, a control device such as a factory automation (FA) computer or a programmable logic controller (PLC).

The maintenance apparatus 5 is a device for a field operator to perform maintenance on a field device. Maintenance of a field device is, for example, a process of reading and checking device information set in the field device, a process of setting new device information (parameters) with respect to the field device, a process of adjusting or changing device information set in the field device, a process of setting the device information in the field device to execute a predetermined operation, or the like. It is assumed that the maintenance apparatus 5 in the present embodiment can perform maintenance of measuring and recording a settling time of the sensor S1.

The settling time of the sensor S1 is a time until a magnitude of an output signal with respect to a reference signal reaches a target value from the input of the reference signal to the sensor S1. The reference signal is, for example, a step input signal or a pulse input signal. A settling time may be prolonged when the sensor S1 has deteriorated over time according to a use situation or an installation environment. A maintenance worker who maintains the plant can check the deterioration or the like of the sensor S1 by periodically or irregularly measuring the settling time of the sensor S1. Measurement of the settling time is performed in an offline state in which the sensor S1 is separated from the operation control device 4. The maintenance worker measures the settling time of the sensor S1, checks the progress situation such as deterioration of the sensor S1, and determines and performs necessary maintenance such as adjustment and replacement of the sensor S1. In order to determine the necessary maintenance on the basis of the measured settling time, a high skill level may be required for the maintenance worker. In the present embodiment, the settling time used for determining the maintenance which is necessary is recorded in the maintenance apparatus 5 and provided as information for generating machine-learning teacher data to the information processing device 1. The maintenance apparatus 5 provides the information processing device 1 connected in a wired or wireless manner with the settling time together with the information of the date and time when the settling time was measured. The settling time may be provided via, for example, a storage medium. The maintenance apparatus 5 is a notebook type or tablet type computer, a personal digital assistant (PDA), a smartphone, or the like.

Although the case in which the settling time is measured as characteristic data of the sensor S1 and is provided to the information processing device 1 has been shown in the present embodiment, the characteristic data is not limited to the settling time. For example, as the characteristic data, a shift amount of a zero point in zero point adjustment or a shift amount of a span in span adjustment may be provided.

The maintenance worker may be a field operator who operates the plant. Although the case in which the plant 100 has the sensor S1 has been described with respect to FIG. 1, the device configuration of the plant 100 is not limited thereto. For example, the plant 100 may be a plant having a device having a tank, a valve, a pump, or another sensor. A link connecting each device shown in FIG. 1 indicates a wired or wireless communication link. Wired communication or wireless communication may be performed via a communication device and a network (not shown).

Figure 2:
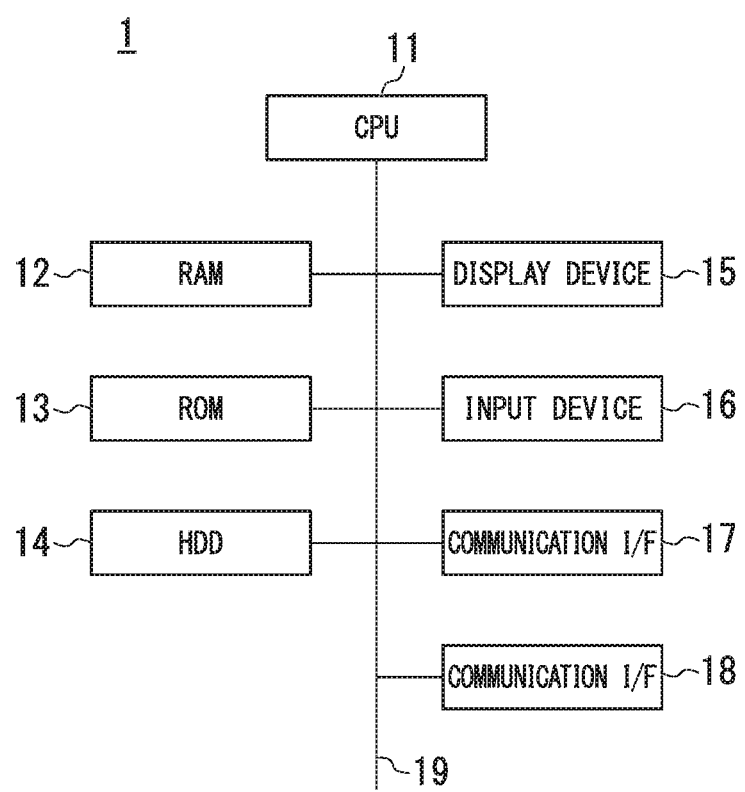
FIG. 2 is a block diagram showing an example of a hardware configuration of an information processing device of the embodiment.

Next, a hardware configuration of the information processing device 1 will be described with reference to FIG. 2. FIG. 2 is a block diagram showing an example of the hardware configuration of the information processing device 1 according to the embodiment.

In FIG. 2, the information processing device 1 includes a central processing unit (CPU) 11, a random access memory (RAM) 12, a read only memory (ROM) 13, a hard disk drive (HDD) 14, a display device 15, an input device 16, a communication interface (I/F) 18, a communication I/F 18, and a bus 19 connecting them.

The information processing device 1 is, for example, a server device, a general-purpose computer such as a desktop type PC, an FA computer, a device such as a PLC, a notebook type or tablet type computer, a PDA, a smartphone, or the like. The hardware of the information processing device 1 may be configured as a single device, and may be a system configured by a combination of a plurality of devices. The information processing device 1 may share hardware with other devices.

The CPU 11 executes a program stored in the RAM 12, the ROM 13, or the HDD 14 to control the information processing device 1. The CPU 11 executes an information processing program for implementing the operation of the information processing device 1 to be described below. For example, the information processing program is acquired from a storage medium on which the information processing program is recorded, a server that provides the information processing program via a network, or the like, installed in the HDD 14, and stored in the RAM 12 so that the information processing program is readable from the CPU 11.

The display device 15 is, for example, a liquid crystal display having a display function. The display device 15 may be implemented in various forms such as a head mount type display, an eyeglass type display, and a wristwatch type display. The input device 16 is, for example, a keyboard or a mouse having an input function. The input device 16 may be a microphone for inputting sound information, a camera or a scanner for inputting image information, or the like. The display device 15 and the input device 16 may be implemented by a device having a display function and an input function such as a touch panel.

The communication I/F 17 controls communication with other devices such as the manufacturing executing system 3, the operation control device 4, and the maintenance apparatus 5 described with reference to FIG. 1 via wired communication or wireless communication. The communication I/F 17 performs communication control such as data transmission/reception, voice communication, mail transmission/reception, and the like with another connected device. For example, the communication I/F 17 performs communication control in conformance with general-purpose communication standards such as wireless LAN communication, wired LAN communication, infrared communication, and short-distance wireless communication.

The communication I/F 18 controls communication with other devices such as the operation control device 4, the maintenance apparatus 5, and a field device (not shown) via wired communication or wireless communication. For example, the communication I/F 18 performs communication control in conformance with to a communication standard dedicated to industrial measuring instruments, such as ISA 100 which is a wireless communication standard of the International Society of Automation (ISA), Highway Addressable Remote Transducer (HART) (registered trademark), BRAIN (registered trademark), a FOUNDATION field bus, and PROFIBUS (registered trademark).

Figure 3:
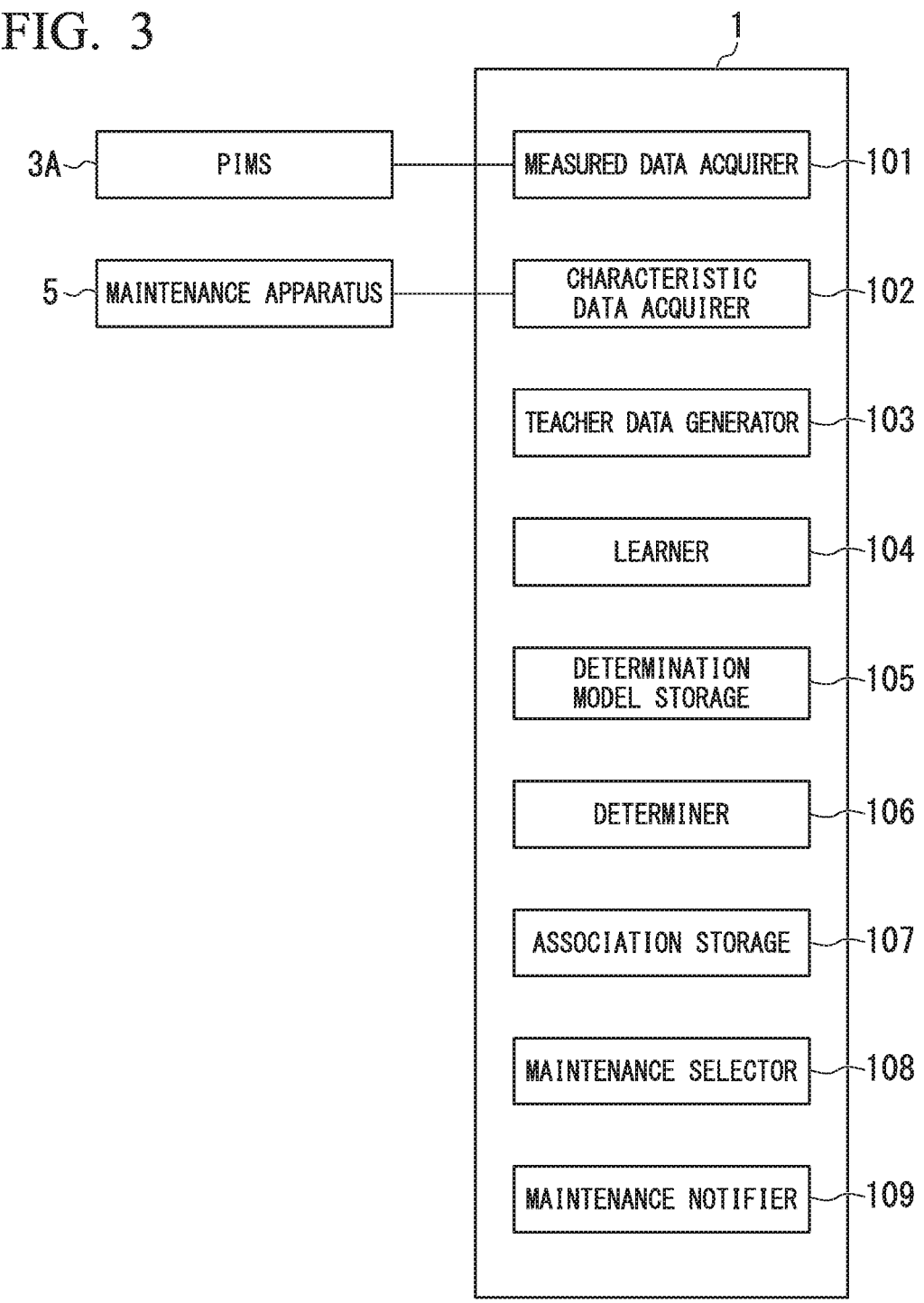
FIG. 3 is a block diagram showing an example of a software configuration of the information processing device of the embodiment.

Next, a software configuration of the information processing device 1 will be described with reference to FIG. 3. FIG. 3 is a block diagram showing an example of the software configuration of the information processing device 1 according to the embodiment.

In FIG. 3, the information processing device 1 includes functions of a measured data acquirer 101 (first acquirer), a characteristic data acquirer 102 (second acquirer), a teacher data generator 103 (generator), a learner 104, a determination model storage 105, a determiner 106, an association storage 107 (storage), a maintenance selector 108 (selector), and a maintenance notifier 109 (notifier). The above-described functions of the information processing device 1 are functional modules implemented by an information processing program for controlling the information processing device 1. The information processing program may be provided from a server providing a program or may be provided from a storage medium.

The measured data acquirer 101 acquires the measured data of the sensor S1. The measured data of the sensor S1 can be acquired from the PIMS 3A which is one function of the manufacturing executing system 3. The measured data acquirer 101 acquires history data of the measured data from the PIMS 3A and acquires current measured data.

A method in which the measured data acquirer 101 acquires the history data of the measured data is arbitrary. For example, the measured data acquirer 101 requests the PIMS 3A to acquire history data. The history data acquisition request may include a designation command for designating the range of the date and time when the measured data was measured. The PIMS 3A may provide history data of the designated date and time range to the measured data acquirer 101. The measured data acquirer 101 may acquire history data periodically transmitted from the PIMS 3A. The acquired history data is used for generating teacher data to be used in a learning phase to be described below.

The measured data acquirer 101 acquires current measured data from the PIMS 3A. The method of acquiring the current measured data is also arbitrary. For example, the measured data acquirer 101 acquires measured data of the sensor S1 from the PIMS 3A substantially in real time. Acquisition substantially in real time is a case in which the measured data is immediately acquired from the PIMS 3A after measurement in the sensor S1 or a case in which the measured data is acquired after a predetermined delay time. Acquisition substantially in real time may include a case in which measured data is acquired in each cycle of a short time such as several seconds. The acquired current measured data is used in the execution phase to be described below.

The characteristic data acquirer 102 acquires the characteristic data of the sensor S1 acquired by maintenance of the sensor S1. The characteristic data acquired in the present embodiment is the settling time of the sensor S1. The characteristic data acquirer 102 acquires the settling time measured from the maintenance apparatus 5. For example, when the settling time of the sensor S1 is measured, the maintenance apparatus 5 transmits information about the settling time and the date and time when the settling time was measured to the characteristic data acquirer 102. For example, the characteristic data acquirer 102 may acquire the settling time measured by another device for measuring the settling time. The characteristic data acquirer 102 may acquire the maintenance information from the function of the CMMS 3B of the manufacturing executing system 3.

The measured data acquirer 101 or the characteristic data acquirer 102 may have a function of a preprocessor. The preprocessor excludes outliers unsuitable for machine learning from the acquired measured data or settling time. For example, whether or not the acquired data is an outlier can be determined using a standard deviation when the acquired data is taken as a sample or a predetermined verification method. The preprocessor may be configured to exclude the acquired data as an outlier when abnormal measured data is expected to be acquired, for example, at a startup time, a shutdown time, a reset time, or the like of the plant.

The teacher data generator 103 generates teacher data in which the settling time which is characteristic data of the sensor S1 acquired by the characteristic data acquirer 102 is associated as label information with the history data of the measured data acquired by the measured data acquirer 101.

Among a plurality of pieces of history data acquired by the measured data acquirer 101, for example, the teacher data generator 103 generates teacher data in which the same label as a label of the last measured settling time is associated with measured data of a range of a measurement date and time of previous history data in which no label is associated from the last date and time when the settling time was measured. That is, the teacher data generator 103 can increase the number of pieces of teacher data by assigning the same label to the measured data within the range of the predetermined measurement date/time. On the other hand, if the number of pieces of data of measured data in the range of the measurement date and time of the history data for associating the label is large, the teacher data generator 103 may reduce the number of pieces of teacher data by thinning the measured data. For example, the teacher data generator 103 generates teacher data by associating a label only with measured data of a measurement date and time close to the measurement date and time of the settling time.

The learner 104 generates a determination model by performing machine learning on the teacher data generated by the teacher data generator 103. A machine learning technique used in the learner 104 is arbitrary. For example, the learner 104 can use a nonlinear classification technique such as a support vector machine (SVM) as the machine learning technique. By designating the measured data as input data, the SVM generates a determination line (a determination model) for clustering measured data and determines a class of the measured data using the generated determination model. The determination line is a boundary line for clustering measured data. The determination line is generated by learning the measured data as the teacher data.

The learner 104 uses a technique of multi-class SVM (MMSVM) in which the number of classes to be classified is n (multi-class). In MMSVM, "nC2" SVMs are prepared for n classes. The classes are classified by associated labels. A label is a flag for clustering input data which has been input. In the machine learning using the teacher data, labeled teacher data is learned by associating a label with data to be learned as the teacher data from among the input data. The learner 104 learns the teacher data and generates a determination model for determining a label with which the input data is clustered.

The machine learning technique used in the learner 104 is not limited to SVM, and, for example, may be a technique using a neural network method such as deep learning.

For example, the determination model storage 105 stores the determination model generated by the learner 104 in the ROM 13 or the HDD 14 of FIG. 2 so that the determination model is readable. The determination model storage 105 may store a plurality of determination models for the sensor S1.

The determiner 106 reads the determination model stored in the determination model storage 105 in the machine learning execution phase and determines the measured data acquired by the measured data acquirer 101 using the read determination model. The determination of the measured data is a determination of a label (a settling time) of the characteristic data of the determination model associated (clustered) with the measured data.

For example, the association storage 107 stores the association between the label (settling time) which is the characteristic data and the maintenance to be performed on the sensor S1 in the ROM 13 or the HDD 14 so that the association is readable. The label of the characteristic data indicates the deterioration state of each sensor S1, and necessary maintenance is associated in advance. In the present embodiment, a case in which where the labels A, B, and C are associated with normal (maintenance is unnecessary), maintenance in which span adjustment is necessary, and maintenance in which sensor replacement are associated will be described below with reference to FIG. 7.

The maintenance selector 108 selects the maintenance associated with the characteristic data determined by the determiner 106 on the basis of association of a label and maintenance stored in the association storage 107.

The maintenance notifier 109 notifies the maintenance worker of the maintenance selected by the maintenance selector 108. For example, the notification of the maintenance is performed by displaying details of the maintenance on the display device 15 in FIG. 2. The notification of the maintenance may be performed by outputting the details of the maintenance by sound from a speaker (not shown). The maintenance notifier 109 may notify the CMMS 3B of the manufacturing executing system 3 by providing the details of the maintenance. The maintenance notifier 109 may notify the maintenance apparatus 5 by providing a To Do list including maintenance of the sensor S1.

The case in which the functions of the measured data acquirer 101, the characteristic data acquirer 102, the teacher data generator 103, the learner 104, the determination model storage 105, the determiner 106, the association storage 107, the maintenance selector 108, and the maintenance notifier 109 of the information processing device 1 in FIG. 3 are implemented by software has been described. One or more of the above-described functions may be implemented by hardware. Each of the above-described functions may be implemented by dividing one function into a plurality of functions. Each of the above-described functions may be implemented by consolidating two or more functions into one function.

Figure 4:
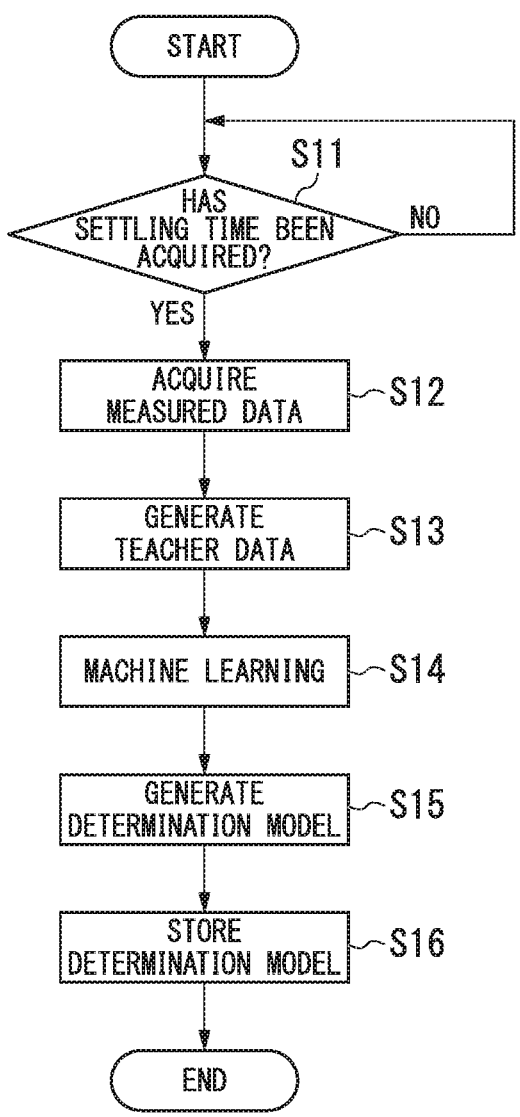
FIG. 4 is a flowchart showing an example of an operation of a learning phase in the information processing device of the embodiment.

Next, the operation of the learning phase in the information processing device 1 will be described with reference to FIG. 4. FIG. 4 is a flowchart showing an example of the operation in the learning phase in the information processing device 1 of the embodiment.

The learning phase is a process until a determination model is generated and stored by generating teacher data from measured data. The operation of the flowchart shown in FIG. 4 has been described with reference to FIG. 3. Each function of the information processing device 1 is assumed to be executed. Accordingly, it is assumed that an operation subject of the following process is the information processing device 1.

In FIG. 4, the information processing device 1 determines whether or not a settling time which is characteristic data of the sensor S1 has been acquired (step S11). The settling time is measured in the maintenance of the sensor S1 using the maintenance apparatus 5. In the determination of whether or not the settling time has been acquired, for example, it is possible to determine whether or not the characteristic data acquirer 102 has received data of the settling time from the maintenance apparatus 5. The settling time is assumed to be acquired at any timing according to the maintenance by the maintenance worker. Accordingly, the learning phase shown in FIG. 4 is assumed to be executed every time the settling time is acquired by the maintenance. The settling time may be acquired by acquiring a history of previous maintenance information from the manufacturing executing system 3. The characteristic data acquirer 102 also acquires information of the settling time and the date and time when the settling time was acquired.

If it is determined that the settling time has not been acquired (step S11: NO), the information processing device 1 repeats the processing of step S11 and waits for acquisition of the settling time.

On the other hand, if it is determined that the settling time has been acquired (step S11: YES), the information processing device 1 acquires the measured data of the sensor S1 (step S12). The acquisition of the measured data is performed, for example, by the measured data acquirer 101 acquiring history data of the measured data from the PIMS 3A. Since the history data acquired in the process of step S12 is used to assign the settling time acquired in step S11 as a label, it is desirable that the measurement date and time of the settling time be close to the measurement date and time of the measured data. The measured data acquirer 101 is assumed to acquire the history data of the measured data measured for a time from the measurement date and time of the previously acquired settling time to the measurement date and time of the currently acquired settling time in step S12. As described above, the measured data acquirer 101 may thin out the measured data so that the number of pieces of measured data to be acquired is less than or equal to a predetermined number.

After the processing of step S12 is executed, the information processing device 1 generates teacher data (step S13). For example, the teacher data generator 103 can generate the teacher data by assigning the settling time acquired in step S11 as a label to the measured data acquired in step S12 in association therewith. The teacher data generator 103 generates the teacher data by assigning the currently acquired settling time as the label to the measured data measured for the time from the measurement date and time of the previously acquired settling time to the measurement date and time of the currently acquired settling time. By associating the measured data with the settling time which is the label according to the measurement date and time, the teacher data generator 103 can automatically generate the teacher data. The association between the measured data and the label may be performed by another method. For example, the association between the measured data and the label may be performed manually. The association may be performed by causing the storage location of the measured data and the storage location of the maintenance information to match.

After the processing of step S13 is executed, the information processing device 1 causes the generated teacher data to be subjected to machine learning (step S14) and generates a determination model (step S15). The machine learning of the teacher data in step S14 and the generation of the determination model in step S15 are performed by the learner 104, for example, in the SVM technique. For example, a plurality of determination models generated in step S15 may be generated according to the operation state of the plant 100 or the like. This is because the relationship between the measured data and the settling time is affected by the operating state of the plant 100 or the like. For example, a determination model differing according to a season, a day of a week, and a time zone in one day may be generated.

After the processing of step S15 is executed, the information processing device 1 stores the generated determination model (step S16). The determination model is stored, for example, by the determination model storage 105 storing the generated determination model in the HDD 14 or the like so that the determination model is readable.

After the processing of step S16 is executed, the information processing device 1 terminates the operation of the learning phase in the flowchart shown in FIG. 4.

Figure 5:
FIG. 5 is a diagram showing an example of teacher data generated by the information processing device of the embodiment.

Next, the teacher data generated in step S13 of FIG. 4 will be described with reference to FIG. 5. FIG. 5 is a diagram showing an example of the teacher data generated by the information processing device 1 of the embodiment.

In FIG. 5, a table (A) shows the history data of the measured data acquired from the PIMS 3A and the settling time acquired from the maintenance apparatus 5 in time series.

The item "measurement date and time" is a date and time when the measured data of the sensor S1 was measured or a date and time when the settling time was measured. The item of "measured data" is measured data (PV) of the sensor S1. Although the case in which the measured data is one numerical value is shown in the table (A) in FIG. 5, the measured data may be a set of a plurality of numerical values or a change in a measured value with respect to passage of time. For example, the change in the measured value can be graphically expressed as a waveform of the measured value with respect to an axis of time. The change in the measured value includes information such as an absolute value and an average value of the measured value and information such as a frequency component.

The item of "settling time" is a settling time of the sensor S1 measured at the "measurement date and time." The table (A) in FIG. 5, for ease of understanding, for example, the settling time expressed by time such as (x.xx seconds) is represented by the letter "A", "B" or "C". The item of "label" is a label of the teacher data assigned to the measured data.

The table (A) in FIG. 5 shows that the measured data of the sensor S1 is measured every one minute. Measured data (PV) of the sensor S1 is "10.123" at 2016/10/01 10:00:00. PV is, for example, temperature, pressure, a current value, a voltage value, or the like. The PIMS 3A records measured data measured every 1 minute as history data.

When the settling time "A" is acquired from the maintenance apparatus 5 at the measurement date and time of 2016/10:25 15:35:00, the measured data acquirer 101 acquires the history data before the measurement date and time from the PIMS 3A. That is, the measured data acquirer 101 acquires measured data measured at a measurement date and time of 2016/10/01 10:00:00 to 2016/10/25 15:35:00.

The teacher data generator 103 assigns the settling time "A" measured at the measurement date and time of 2016/10/25 15:35:00 as a label to the measured data measured at the measurement date and time of 2016/10/01 10:00:00 to 2016/10/25 15:35:00.

Likewise, when the settling time "B" is acquired from the maintenance apparatus 5 at a measurement date and time of 2016:12/10 12:21:00, the measured data acquirer 101 acquires history data from which the previously acquired measured data is excluded from the PIMS 3A before the measurement date and time. That is, the measured data acquirer 101 acquires measured data measured at the measurement date and time of 2016/10/25 15:36:00 to 2016/12/10 12:21:00.

The teacher data generator 103 assigns the settling time "B" measured at the measurement date and time of 2016/12/10 12:21:00 as the label to the measured data measured at the measurement date and time of 2016/10/25 15:36:00 to 2016/12/10 12:21:00. Similar processing is executed even when the settling time "C" is acquired.

A table (B) in FIG. 5 shows teacher data generated by the teacher data generator 103 in the processing of step S13 of FIG. 4. The teacher data has a numerical value of "measured data" and information of "label" assigned to the measured data. By learning this teacher data, association between the measured data and the labels is subjected to machine learning, and a determination model is generated. The measured data may be a waveform of a change in the measured value with respect to passage of time as described above. The generated teacher data is subjected to the machine learning in the processing of step S14.

Next, the operation in the execution phase in the information processing device 1 will be described with reference to FIG. 6. FIG. 6 is a flowchart showing an example of the operation in the execution phase in the information processing device 1 of the embodiment.

The execution phase is a process of determining the acquired measured data by using the determination model generated in the learning phase described in FIG. 4. It is assumed that the operation of the flowchart shown in FIG. 6 is also executed in each function of the information processing device 1 described with reference to FIG. 3, and the operation subject of the following process is the information processing device 1.

In FIG. 6, the information processing device 1 determines whether or not measured data has been acquired (step S21). For example, whether or not the measured data has been acquired is determined on the basis of whether or not the measured data acquirer 101 has acquired measured data to be determined from the PIMS 3A. There is a difference in that the measured data acquired in step S12 of FIG. 4 is used to generate the teacher data and the measured data acquired in step S21 is a determination target. The measured data acquired in step S21 may be used for generating the teacher data.

If it is determined that the measured data has not been acquired (step S21: NO), the information processing device 1 repeats the processing of step S21 and waits for acquisition of measured data.

On the other hand, if it is determined that the measured data has been acquired (step S21: YES), the information processing device 1 executes the determination process (step S22). The determination process is a process of determining a determination region in which the measured data acquired in step S21 is included (classified) when the determination model generated in the learning phase (step S15) is applied. In the determination process, if there are a plurality of determination regions determined by a plurality of labels, a region in which the measured data is included is determined. For example, the determination process is executed by the determiner 106. The determiner 106 determines a region as which the measured data acquired in the processing of step S21 is classified by three types of labels "A" to "C" exemplified in FIG. 5. For example, when the acquired measured data is 10.247, it is determined to be classified as the label "B" given in the table (B) in FIG. 5.

After the processing of step S22 is executed, the information processing device 1 selects the maintenance of the sensor S1 on the basis of a processing result of the determination process (step S23). For example, maintenance is selected by the maintenance selector 108 reading the association between the characteristic data of the sensor S1 classified by the label stored in the association storage 107 and the maintenance and selecting one or more maintenance operations from a result of the determination process.

The association between the characteristic data of the sensor S1 classified by labels and the maintenance will be described with reference to FIG. 7. FIG. 7 is a diagram showing an example of association between characteristic data and maintenance stored by the information processing device 1 of the embodiment.

In FIG. 7, the labels "A", "B" and "C" for classifying the characteristic data are associated with maintenance. For example, the settling time classified by the label "A" is a normal range in which maintenance is unnecessary, and is associated with normal (maintenance is unnecessary). The settling time classified by the label "B" is a range in which maintenance of span adjustment is necessary and is associated with necessary span adjustment. The settling time classified by the label "C" is a range in which maintenance of sensor replacement is necessary, and is associated with necessary sensor replacement. For example, as described above, if the acquired measured data is 10.247, since it is determined that the measured data is classified as the label "B," maintenance of "span adjustment is required" is selected. For example, the association thereof is set in advance by the association storage 107 and stored in the HDD 14 or the like so that the association is readable from the maintenance selector 108.

In FIG. 7, a case where one maintenance operation is associated with each of labels "A" to "C" has been exemplified, but the association between the label and the maintenance is not limited thereto. For example, the number of labels to be classified may be 2 or 4 or more. A plurality of maintenance operations may be associated with one label. Instead of a case in which there are only operation names as shown in FIG. 7 in terms of maintenance to be associated, for example, details of more detailed maintenance such as numerical values of parameters to be set in the field device in the maintenance and a maintenance procedure may be designated. Instead of the fixed information, the maintenance to be associated may include information in which details of maintenance change according to a predetermined condition.

Returning to the explanation of FIG. 6 again, after the processing of step S23 is executed, the information processing device 1 provides a notification of the information of the selected maintenance (step S24). For example, the notification of the information of the maintenance is provided by the maintenance notifier 109 displaying the details of the maintenance on the display device 15 of FIG. 2 or the like.

After the processing of step S24 is executed, the information processing device 1 terminates the operation of the execution phase in the flowchart shown in FIG. 6.

Figure 8:
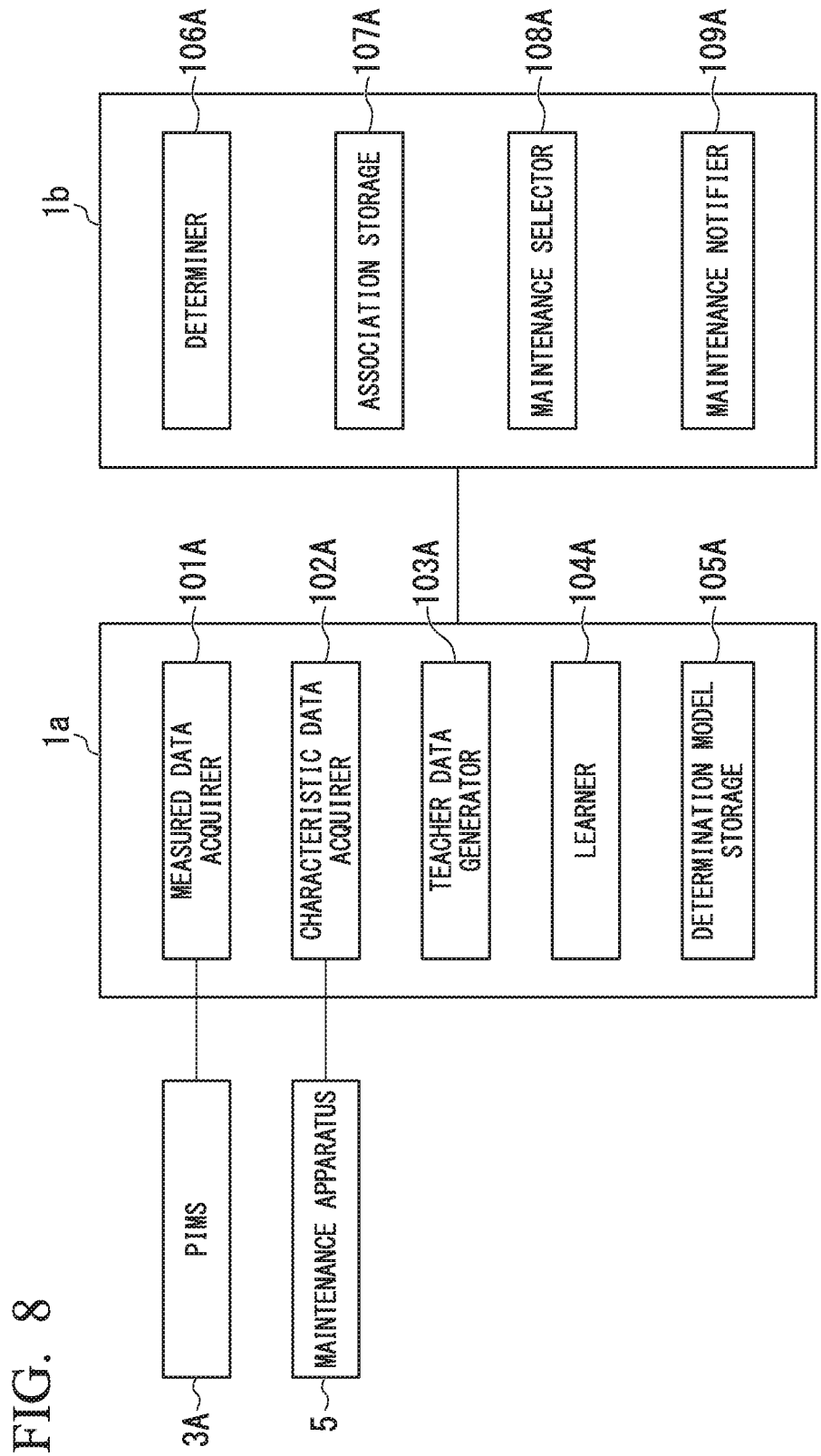
FIG. 8 is a block diagram showing another example of the software configuration of the information processing device of the embodiment.

Next, a case in which a part of the software configuration of the information processing device 1 is implemented by another device will be described with reference to FIG. 8. FIG. 8 is a block diagram showing another example of the software configuration of the information processing device of the embodiment. The software configuration of the information processing device 1 shown in FIG. 8 is an alternative means of the software configuration described in FIG. 3. In FIG. 8, a part of the description of the same functional configuration as in FIG. 3 will be omitted.

FIG. 8 shows a case in which the function of the information processing device 1 in FIG. 3 is divided into two devices of an information processing device 1a and an information processing device 1b. As described with reference to FIG. 1, the information processing device 1a and the information processing device 1b are arranged in the plant 100 as devices separate from the device such as the manufacturing executing system 3 or the maintenance apparatus 5. Also, hardware configurations of the information processing device 1a and the information processing device 1b are similar to those of the information processing device 1 described with reference to FIG. 2.

In FIG. 8, the information processing device 1a has functions of a measured data acquirer 101A, a characteristic data acquirer 102A, a teacher data generator 103A, a learner 104A, and a determination model storage 105A. The information processing device 1b has functions of a determiner 106A, an association storage 107A, a maintenance selector 108A, and a maintenance notifier 109A.

The above-described functions of the information processing device 1a or the information processing device 1b are functional modules implemented by an information processing program that controls the information processing device 1a or the information processing device 1b. The information processing program may be provided from a server providing a program or may be provided from a storage medium.

In the information processing device 1a, the measured data acquirer 101A acquires measured data of the sensor S1. The measured data acquirer 101A provides the acquired measured data to the characteristic data acquirer 102A and also provides the acquired measured data to the determiner 106A of the information processing device 1b. The characteristic data acquirer 102A acquires the characteristic data of the sensor S1 acquired by maintenance of the sensor S1. The teacher data generator 103A generates teacher data in which the settling time which is characteristic data of the sensor S1 acquired by the characteristic data acquirer 102A is associated as label information with history data of the measured data acquired by the measured data acquirer 101A. The learner 104A generates a determination model by performing machine learning on the teacher data generated by the teacher data generator 103A. The determination model storage 105A stores the determination model generated by the learner 104A so that the determination model is readable from the determiner 106A of the information processing device 1b. The determination model storage 105A may transmit the generated determination model to the determiner 106A.

In the information processing device 1b, the determiner 106A reads the determination model stored in the determination model storage 105a in the machine learning execution phase, and uses the read determination model to determine the measured data acquired by the measured data acquirer 101A. For example, the association storage 107A stores the association between the label which is the characteristic data and the maintenance to be performed on the sensor S1 in the ROM 13 or the HDD 14 so that the association is readable. The maintenance selector 108A selects the maintenance associated with the characteristic data determined by the determiner 106A on the basis of the association between the label and the maintenance stored in the association storage 107A. The maintenance notifier 109A notifies the maintenance worker of the maintenance selected by the maintenance selector 108A.

That is, the information processing device 1a executes a learning phase in machine learning. On the other hand, the information processing device 1b executes an execution phase in the machine learning. By designating the device for executing the learning phase and the device for executing the execution phase as separate devices, for example, different maintenance workers can separately and independently execute phases in the machine learning. It is possible to simplify a functional configuration (an information processing program) of each device since each device can be designated as a dedicated device for use in each phase by designating the device for executing the learning phase and the device for executing the execution phase as the separate devices. For example, since the determination model with high precision may be used for a long period of time without changing the determination model, the information processing device 1a may reduce a use frequency after the determination model is generated. On the other hand, in order to ascertain the state of the sensor S1, the determination of measured data in the execution phase may be performed with a high frequency. By simplifying the functional configuration of the information processing device 1b, for example, it is possible to reduce the introduction cost of the information processing device 1b when maintenance using a plurality of information processing devices 1b is executed.

Although the case in which the information processing device 1a and the information processing device 1b are arranged as devices separate from a device such as the manufacturing executing system 3 or the maintenance apparatus 5 in the plant 100 has been described, the function of the information processing device 1a or the information processing device 1b may be implemented in another device of the plant 100. For example, the function of the information processing device 1a may be executed as a part of the manufacturing executing system 3. In the function of the PIMS 3A and the function of the CMMS 3B in the manufacturing executing system 3, history data of measured data used in the information processing device 1a and characteristic data such as a settling time is collected. By performing the function of the information processing device 1a as a part of the manufacturing executing system 3, it is unnecessary to arrange individual devices and it is possible to reduce the introduction cost. The function of the information processing device 1b may be performed as a part of the maintenance apparatus. By executing the function of the information processing device 1b as a part of the maintenance apparatus, it is possible to execute the function from acquisition of measured data to determination of maintenance and notification of maintenance in the maintenance apparatus 5 and it is possible to improve the efficiency of the maintenance of the sensor S1 using the maintenance apparatus 5.

The case in which the functions of the measured data acquirer 101A, the characteristic data acquirer 102A, the teacher data generator 103A, the learner 104A, and the determination model storage 105a of the information processing device 1a in FIG. 8 are implemented by software has been described. One or more of the above-described functions may be implemented by hardware. The case in which the functions of the determiner 106A, the association storage 107A, the maintenance selector 108A, and the maintenance notifier 109A of the information processing device 1b are implemented by software has been described. One or more of the above-described functions may be implemented by hardware. Each of the above-described functions may be implemented by dividing one function into a plurality of functions. Each of the above-described functions may be implemented by consolidating two or more functions into one function.

Figure 9:
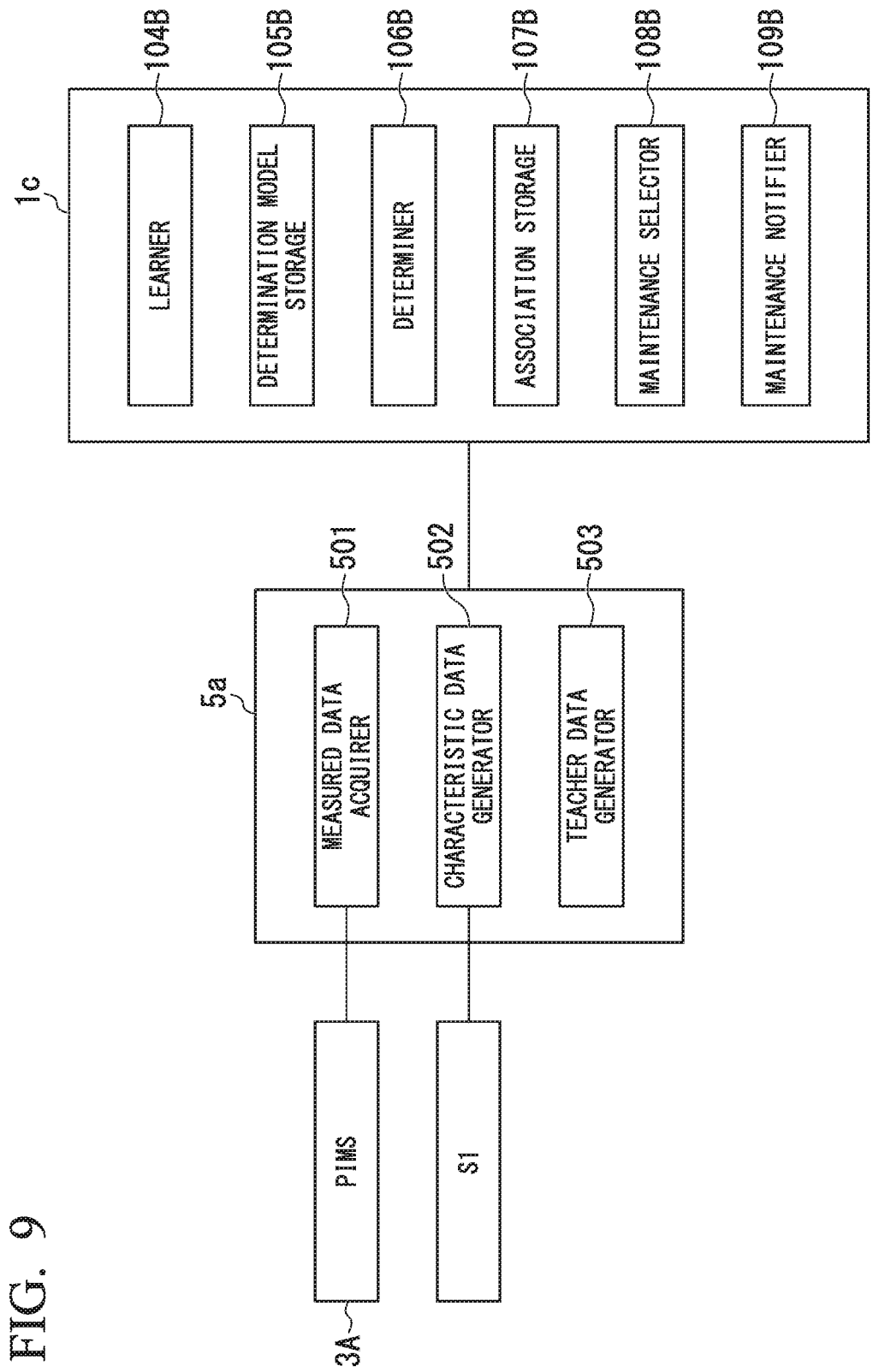
FIG. 9 is a block diagram showing an example of a software configuration of a maintenance apparatus and the information processing device of the embodiment.

Next, the software configuration of the maintenance apparatus 5a and the information processing device 1c will be described with reference to FIG. 9. FIG. 9 is a block diagram showing an example of a software configuration of the maintenance apparatus 5a and the information processing device 1c of the embodiment.

FIG. 9 is for realizing some of the functions of the information processing device 1 in FIG. 3 in the maintenance apparatus 5a. FIG. 9 shows a case in which the functions of the information processing device 1 are implemented by the maintenance apparatus 5a and the information processing device 1c. Hardware configurations of the maintenance apparatus 5a and the information processing device 1c are similar to that of the information processing device 1 described with reference to FIG. 2.

In FIG. 9, the maintenance apparatus 5a has functions of a measured data acquirer 501 (first acquirer), a characteristic data generator 502 (first generator), and a teacher data generator 503 (second generator). The information processing device 1c has functions of a learner 104B, a determination model storage 105B, a determiner 106B, an association storage 107B, a maintenance operation selecting unit 108B, and a maintenance notifier 109B.

The functions of the maintenance apparatus 5a and the information processing device 1c are functional modules implemented by an information processing program for controlling the maintenance apparatus 5a and the information processing device 1c. The information processing program may be provided from a program providing server or may be provided from a storage medium.

In the maintenance apparatus 5a, the measured data acquirer 501 acquires the measured data of the sensor S1. For example, if the maintenance apparatus 5a is a device that performs maintenance to acquire and record the measured data of the sensor S1, the measured data acquirer 501 can acquire the measured data acquired in the maintenance of the sensor S1 as it is.

The characteristic data generator 502 calculates (generates) a settling time which is characteristic data of the sensor S1 on the basis of the measured data of the sensor S1 acquired by the measured data acquirer 501. The calculated settling time is assumed to be recorded as maintenance information. As described with reference to FIG. 5, the teacher data generator 503 generates teacher data in which the settling time which is characteristic data of the sensor S1 generated in the characteristic data generator 502 is associated as label information with the history data of the measured data acquired by the measured data acquirer 501.

That is, the maintenance apparatus 5a described with reference to FIG. 9 includes a measured data acquirer 501 that acquires measured data of the sensor S1, a characteristic data generator 502 that generates characteristic data on the basis of the measured data of the sensor, and the teacher data generator 503 that generates teacher data in which the generated characteristic data is associated as label information with the acquired measured data, thereby generating the teacher data as in the information processing device 1 described with reference to FIG. 3. The characteristic data generator 502 can simultaneously execute the maintenance of the settling time measurement and the generation of the teacher data by generating the settling time of the sensor S1 as the characteristic data.

The information processing device 1c has the functions of the learner 104B, the determination model storage 105B, the determiner 106B, the association storage 107B, the maintenance operation selecting unit 108B, and the maintenance notifier 109B. The learner 104B generates a determination model by performing machine learning on the teacher data generated by the teacher data generator 503. The determination model storage 105B stores the determination model generated by the learner 104B. The determiner 106B reads the determination model stored in the determination model storage 105B in the machine learning execution phase and determines the measured data acquired by the measured data acquirer 501 by using the read determination model. For example, the association storage 107B stores the association between the label which is the characteristic data and the maintenance to be performed on the sensor S1 in the ROM 13 or the HDD 14 so that the association is readable. The maintenance selector 108B selects the maintenance associated with the characteristic data determined by the determiner 106B on the basis of the association between the label and the maintenance stored in the association storage 107B. The maintenance notifier 109B notifies the maintenance worker of the maintenance selected by the maintenance selector 108B.

That is, the maintenance apparatus 5a can divert the settling time calculated in the maintenance to the teacher data of the machine learning. Thereby, it is possible to simultaneously perform the maintenance of the settling time measurement and the teacher data generating process of the machine learning and it is possible to improve the efficiency of the maintenance.

Although the case in which the information processing device 1c is arranged in the plant 100 as a device separate from the device such as the manufacturing executing system 3 or the maintenance apparatus 5 has been described, the function of the information processing device 1c may be implemented in another device of the plant 100. For example, the function of the information processing device 1c may be implemented as a part of the manufacturing executing system 3 or the like.

Although the case in which the functions of the measured data acquirer 501, the characteristic data generator 502, and the teacher data generator 503 of the maintenance apparatus 5a in FIG. 9 are implemented by software has been described. One or more of the above-described functions may be implemented by hardware. The case in which the functions of the learner 104B, the determination model storage 105B, the determiner 106B, the association storage 107B, the maintenance selector 108B, and the maintenance notifier 109B of the information processing device 1c are implemented by software has been described. One or more of the above-described functions may be implemented by hardware. Each of the above-described functions may be implemented by dividing one function into a plurality of functions. Each of the above-described functions may be implemented by consolidating two or more functions into one function.

As described above, the information processing device of the present embodiment includes: a measured data acquirer configured to acquire measured data of a sensor; a characteristic data acquirer configured to acquire characteristic data of the sensor acquired by maintenance of the sensor; and a teacher data generator configured to generate teacher data in which the acquired characteristic data is associated as label information with the acquired measured data, thereby reducing an increase in cost accompanying maintenance.

It is only necessary for the above-described information processing device 1 to be any device having the above-described function. For example, the above-described information processing device 1 may be implemented by a system in which devices configured in a combination of a plurality of devices are communicably connected. The information processing device 1 may be implemented as some of the functions of the manufacturing executing system 3, the operation control device 4, the maintenance apparatus 5, and the like described with respect to FIG. 1.

The information processing method of the present embodiment includes: a measured data acquiring step of acquiring measured data of a sensor; a characteristic data acquiring step of acquiring characteristic data of the sensor acquired by maintenance of the sensor; and a teacher data generating step of generating teacher data in which the acquired characteristic data is associated as label information with the acquired measured data, thereby reducing an increase in cost accompanying maintenance.

The execution order of each step in the information processing method of the present embodiment is not limited to the order described in the above-described steps, and may be executed in any order.

Various processes described in the present embodiment may be performed by recording a program for implementing functions of the device described in the present invention on a computer-readable storage medium and causing a computer system to read and execute the program recorded on the storage medium. The "computer system" used here is assumed to include an operating system (OS) and hardware such as peripheral devices. If a World Wide Web (WWW) system is used, the "computer system" is assumed to include having a homepage providing environment (or displaying environment). The "computer-readable storage medium" refers to a storage device including a rewritable non-volatile memory such as a flexible disk, a magneto-optical disc, a read only memory (ROM), or a flash memory, a portable medium such as a compact disc (CD)-ROM, and a hard disk embedded in the computer system.

Furthermore, the "computer-readable storage medium" is assumed to include a medium that holds a program for a constant period of time, such as a volatile memory (for example, a dynamic random access memory (DRAM)) inside a computer system serving as a server or a client when the program is transmitted via a network such as the Internet or a communication circuit such as a telephone circuit. The above-described program may be transmitted from a computer system storing the program in a storage device or the like via a transmission medium or transmitted to another computer system by transmission waves in a transmission medium. The "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. The above-described program may be a program capable of implementing the above-described function in combination with a program already recorded on the computer system, i.e., a so-called differential file (differential program).

Although embodiments of the present invention have been described above with reference to the drawings, specific configurations are not limited to the embodiments, and various changes may also be included without departing from the scope of the present invention.

What is claimed is:

1. An information processing device comprising:
   a first acquirer configured to acquire measured data of a sensor;
   a second acquirer configured to acquire characteristic data of the sensor, the characteristic data having been acquired by maintaining the sensor;
   a generator configured to generate teacher data in which the acquired characteristic data is associated as label information with the acquired measured data;
   a learner configured to learn the generated teacher data to generate a determination model for determining the label information to be associated with the acquired measured data;
   a determiner configured to determine the label information to be associated with the acquired measured data using the generated determination model;
   a storage storing the label information of and maintenance to be performed on the sensor which are associated with each other;
   a selector configured to select maintenance associated with the determined label information from the stored maintenance; and
   a notifier configured to perform notification of the selected maintenance.

2. The information processing device according to claim 1, wherein
   the generator is configured to generate the teacher data in which the label information of the acquired characteristic data is associated with a plurality of pieces of previous measured data in which the label information has not been associated.

3. The information processing device according to claim 1, wherein
   the second acquirer is configured to acquire a settling time of the sensor as the characteristic data.

4. The information processing device according to claim 1, wherein
   the second acquirer is configured to acquire a shift amount of a zero point in zero point adjustment of the sensor as the characteristic data.

5. The information processing device according to claim 1, wherein
   the second acquirer is configured to acquire a shift amount of a span in span adjustment of the sensor as the characteristic data.

6. The information processing device according to claim 1, wherein the first acquirer is configured to acquire the measured data and a measurement date and time of the measured data, the second acquirer is configured to acquire the characteristic data and a measurement date and time of the characteristic data, and the generator is configured to associate the acquired measured data with the acquired characteristic data according to the measurement date and time of the measured data and the measurement date and time of the characteristic data.

7. The information processing device according to claim 6, wherein the generator is configured to generate the teacher data by assigning a currently acquired characteristic data as the label information to the measured data measured for the time from the measurement date and time of a previously acquired characteristic data to the measurement date and time of the currently acquired characteristic data.

8. A maintenance apparatus comprising:

a first acquirer configured to acquire measured data of a sensor;

a first generator configured to generate characteristic data on the basis of the measured data;

a second generator configured to generate teacher data in which the generated characteristic data is associated as label information with the acquired measured data;

a learner configured to learn the generated teacher data to generate a determination model for determining the label information to be associated with the acquired measured data;

a determiner configured to determine the label information to be associated with the acquired measured data using the generated determination model;

a storage storing the label information of and maintenance to be performed on the sensor which are associated with each other;

a selector configured to select maintenance associated with the determined label information from the stored maintenance; and a notifier configured to perform notification of the selected maintenance.

9. The maintenance apparatus according to claim 8, wherein the first generator is configured to generate a settling time of the sensor as the characteristic data.

10. An information processing method comprising:

acquiring measured data of a sensor;

acquiring characteristic data of the sensor, the characteristic data having been acquired by maintaining the sensor;

generating teacher data in which the acquired characteristic data is associated as label information with the acquired measured data;

learning the generated teacher data to generate a determination model for determining the label information to be associated with the acquired measured data;

determining the label information to be associated with the acquired measured data using the generated determination model;

storing the label information and maintenance to be performed on the sensor which are associated with each other;

selecting maintenance associated with the determined label information from the stored maintenance; and performing notification of the selected maintenance.

11. The information processing method according to claim 10, wherein generating the teacher data comprises generating the teacher data in which the label information of the acquired characteristic data is associated with a plurality of pieces of previous measured data in which the label information has not been associated.

12. The information processing method according to claim 10, wherein acquiring the characteristic data comprises acquiring a settling time of the sensor as the characteristic data.

13. The information processing method according to claim 10, wherein acquiring the characteristic data comprises acquiring a shift amount of a zero point in zero point adjustment of the sensor as the characteristic data.

14. The information processing method according to claim 10, wherein acquiring the characteristic data comprises acquiring a shift amount of a span in span adjustment of the sensor as the characteristic data.

15. The information processing method according to claim 10, further comprising:

generating characteristic data on the basis of the acquired measured data, wherein generating the teacher data comprises generating teacher data in which the generated characteristic data is associated as label information with the acquired measured data.

16. A non-transitory computer-readable storage medium storing a program, which when executed by a computer, causes the computer to:

acquire measured data of a sensor;

acquire characteristic data of the sensor, the characteristic data having been acquired by maintaining the sensor;

generate teacher data in which the acquired characteristic data is associated as label information with the acquired measured data;

learn the generated teacher data to generate a determination model for determining the label information to be associated with the acquired measured data;

determine the label information to be associated with the acquired measured data using the generated determination model;

store the label information and maintenance to be performed on the sensor which are associated with each other;

select maintenance associated with the determined label information from the stored maintenance; and perform notification of the selected maintenance.

* * * * *